(12) United States Patent
Wilson et al.

(10) Patent No.: US 8,023,534 B2
(45) Date of Patent: Sep. 20, 2011

(54) SIGNAL PROCESSOR LATENCY MEASUREMENT

(75) Inventors: Dennis L. Wilson, Palo Alto, CA (US);
Brian Kidder, Fremont, CA (US);
Tahmineh Kazemi, Saratoga, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1471 days.

(21) Appl. No.: 10/356,228

(22) Filed: Jan. 31, 2003

(65) Prior Publication Data
US 2004/0151210 A1 Aug. 5, 2004

(51) Int. Cl.
*H04J 3/06* (2006.01)
(52) U.S. Cl. .................... 370/516; 370/252
(58) Field of Classification Search .......... 370/516, 370/517, 518, 519, 252
See application file for complete search history.

(56) References Cited

U.S. PATENT DOCUMENTS

| | | | | |
|---|---|---|---|---|
| 5,397,992 A | * | 3/1995 | Hill | 324/617 |
| 5,459,402 A | * | 10/1995 | Ueno et al. | 324/617 |
| 5,764,598 A | * | 6/1998 | Okayasu | 368/120 |
| 6,327,218 B1 | * | 12/2001 | Bosshart | 365/233 |
| 6,389,381 B1 | * | 5/2002 | Isoda et al. | 703/19 |

* cited by examiner

*Primary Examiner* — Brian Nguyen
(74) *Attorney, Agent, or Firm* — Oliff & Berridge, PLC

(57) ABSTRACT

Systems and methods that measure the delay (latency) through a digital processor or circuit. A waveform generator outputs a primary (chirp) signal to the digital circuit, along with an auxiliary pulse signal to a delay circuit. The auxiliary signal corresponds to a sample of the primary signal that is input to and output from the digital circuit. A clock circuit provides input and output clock signals to the digital circuit and delay circuit. Clocked outputs of the digital circuit and delay circuit are input to an analyzer. The time delay between the auxiliary signals and delayed auxiliary signals are measured by a time measurement circuit. The analyzer processes the outputs of the processor and delay circuit and the time delay (reference time) using an analysis routine to determine the latency of the digital circuit. The analyzer collects data containing primary signals during a data collection time period, and determines the latency of the digital circuit by adding the data collection time to the reference time and subtracting the time between the start of data collection and the delayed auxiliary signal.

5 Claims, 3 Drawing Sheets

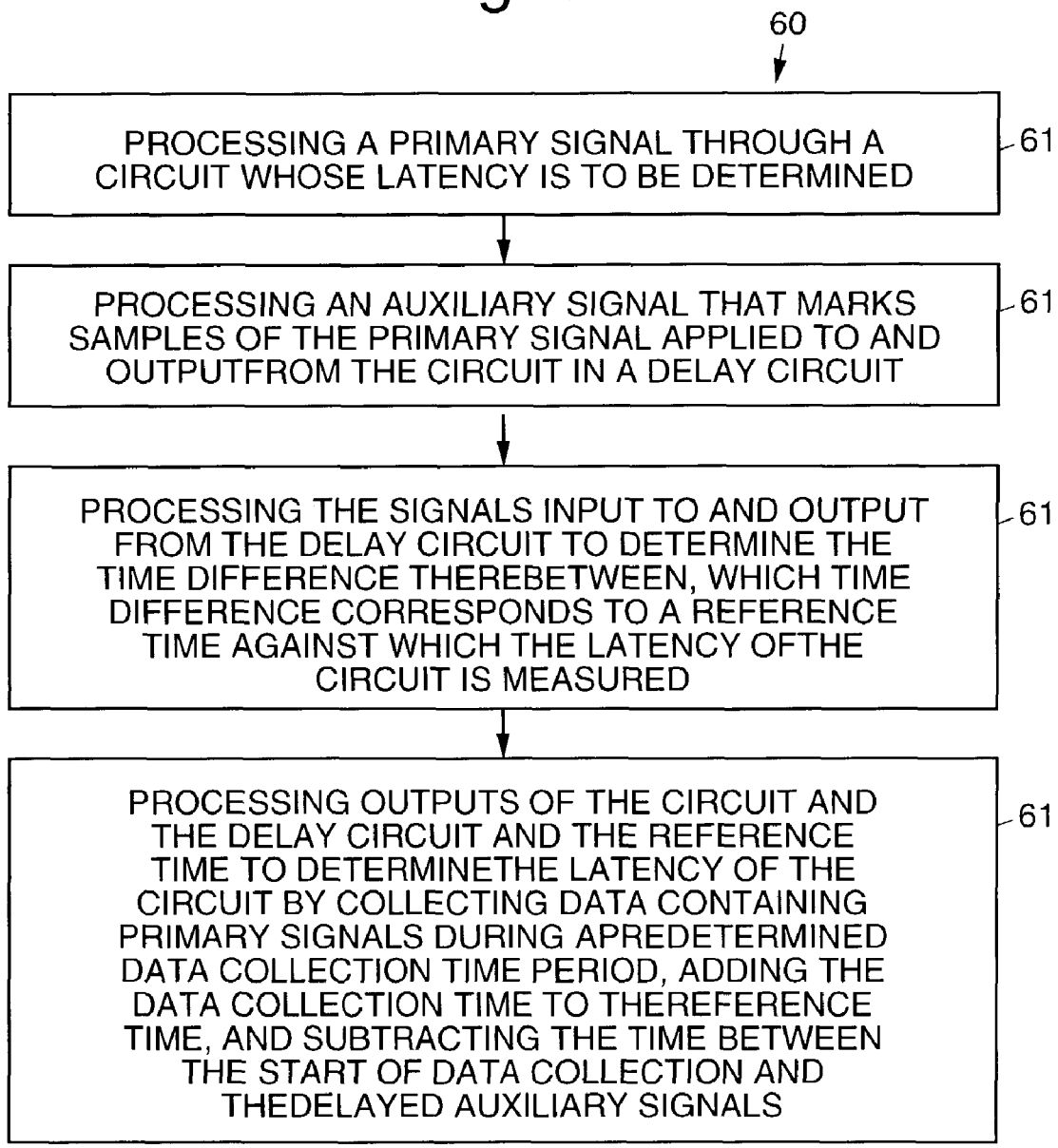

1

SIGNAL PROCESSOR LATENCY MEASUREMENT

BACKGROUND

The present invention relates generally to signal processors, and more particularly, to techniques that measure latency of a digital processor or circuit.

A digital signal processor or circuit can have a well defined latency. For simple processors the latency is just a count of the number of clocks of delay for the signal as it passes through the circuit. More complex processing can change the sample rate or delay the signal by an amount that is not equal to a sample interval.

More particularly, a digital signal processor delays the signal as the signal is processed. The delay of some processors such as a shift register, for example, is a count of the number of clocks required to shift the signal through the shift register. A filter will delay the signal by an amount depending on the filter coefficients. The delay may be a fixed number of samples, but an interpolator will change the sample rate, introducing a complication into the calculation of delay. Even a simple filter with no change in the sample rate may have a delay that is not an integer number of samples. Finite Impulse Response (FIR) filters with an even number of taps that are symmetrical about the center will have a delay that is equal to half the number of samples in the filter plus one half sample.

More complex processing will change the sample rate while correcting for differences in the input and output sample rates. Examples of such processors are those that correct a plesiochronous input sample rate to the station clock standard in a processor that is connected to an outside source with a different clock.

Another complication is the measurement of the latency when the processing changes the frequency of the signal. When the processing includes conversion to an analog form, the latency becomes harder to measure. There is no well defined output clock to provide a sample time that can be used as a reference.

A typical measurement of latency in the past introduces a pulse at the input to the processor and measures the time required for the pulse to propagate through the processor to the output. A simple time-interval measurement from the rising edge of the input pulse to the rising edge of the output pulse will measure the latency of the processor.

An alternative technique that is useful in limited circumstances is that used by a network analyzer. The network analyzer measures the change in phase from the input to the output. The delay through a simple circuit is the group delay through the circuit. The network analyzer measures the change of phase at a sequence of different frequencies then calculates the group delay as the rate of change of phase. This technique works well when the input sample rate is the same as the output sample rate so that the input phase can be compared with the output phase easily.

When the processor changes the sample rate or performs resampling to correct for an asynchronous input, these techniques will not be able to measure latency. The latency will not be an integer number of samples of the input sample rate, so a pulse at the input may be delayed by an amount that results in an output pulse that is between output samples.

The processing may destroy the pulse as happens when the frequency of the sample is shifted. Changing the sample rate of a complex signal, a signal with an in-phase and quadrature component, typically changes the center frequency of the signal as well. That is, a signal centered at one fourth the input sample will end at a frequency centered at one fourth the output sample rate. This processing keeps the bandpass signal centered in the available output bandwidth, but shifts the frequency in the processing. When the pulse is ill defined at either the input or the output, the measurement of the time between the input pulse and the output pulse is not possible.

It is an objective of the present invention to provide for improved techniques that measure latency of a digital processor or circuit.

SUMMARY OF THE INVENTION

To meet the above and other objectives, the present invention provides for measurement of latency of a digital processor or circuit, and particularly provides for latency measurement when the processor or circuit changes the sample rate, interpolates an input signal or signal data, or changes the frequency of the input signal. The present invention is thus able to measure latency for complex signal processing circuitry, which is not possible using known prior art techniques.

An exemplary embodiment of the present invention comprises a waveform generator that outputs a primary signal (chirp signal) to a processor or circuit whose latency is to be determined. A chirp signal is a sine wave whose frequency changes linearly with time forming a "chirp". The waveform generator also outputs an auxiliary signal (pulse) to a delay circuit. The auxiliary signal corresponds to a sample at the beginning of the primary signal that is input to and output from the processor or circuit. A clock circuit provides input and output clock signals to the processor and delay circuit. Clocked outputs of the processor and delay circuit are input to an analyzer. The time delay between the auxiliary signal (pulse) and delayed auxiliary signal (pulse) is measured by a time measurement circuit. The analyzer processes the outputs of the processor and delay circuit and the time delay (or reference time) output by the time measurement circuit using an analysis routine to determine the latency of the processor. The analyzer collects data containing primary signals during a predetermined data collection time period, and determines the latency of the circuit by adding the data collection time to the reference time and subtracting the time between the start of data collection and the delayed auxiliary signal.

An exemplary latency measurement method comprises the following steps. An input signal is processed by a circuit whose latency is to be determined. An auxiliary signal that marks a sample of the input signal applied to and output from the circuit are processed by a delay circuit. The signals input to and output from the delay circuit are processed to determine the time difference therebetween, which corresponds to a reference time against which the latency of the circuit is measured. Outputs of the circuit and delay circuit are processed by an analyzer along with the reference time to determine the latency of the circuit. Data containing primary signals are collected during a predetermined data collection time period. The latency of the circuit is determined by adding the data collection time to the reference time and subtracting the time between the start of data collection and the delayed auxiliary signal.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 6 is a flow chart illustrating an exemplary latency measurement method in accordance with the principles of the present invention.

DETAILED DESCRIPTION

Figure 1:
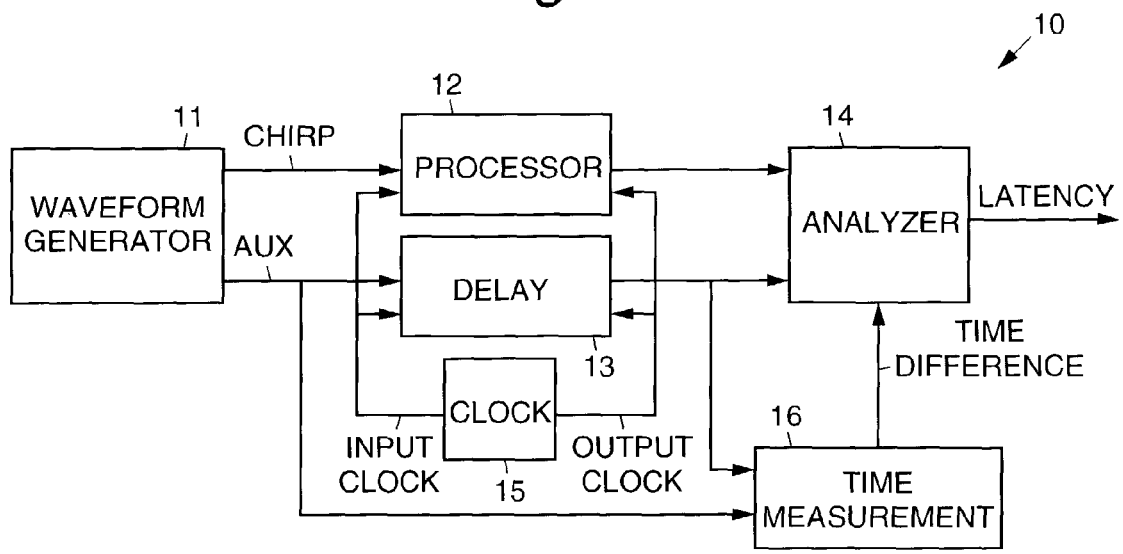
FIG. 1 is a block diagram of an exemplary system that implements latency measurement in accordance with the principles of the present invention.

Referring to the drawing figures, FIG. 1 illustrates latency measurement in accordance with the principles of the present invention implemented in an exemplary system 10. The exemplary system 10 comprises a waveform generator 11 that outputs chirp signals and auxiliary pulses. The chirp signals are input to a circuit 12 or processor 12 whose latency is to be determined. The auxiliary pulses are input to a delay circuit 13. Outputs of the processor 12 and delay circuit 13 are input to an analyzer 14. A clock circuit 15 provides input and output clock signals to the processor 12 and delay circuit 13. The time delay between the auxiliary pulse and delayed auxiliary pulse are measured by a time measurement circuit 16. The auxiliary pulse is a square pulse one sample long that is used to trigger the time measurement circuit 16.

Precision measurement of latency is performed by using the chirp signal as a data signal along with auxiliary pulses to mark samples of the input and output to the processor 12. The waveform generator 11 provides the chirp signal and the auxiliary pulse used in the measurement. The chirp is passed through the processor 12 (or function) whose latency is to be measured.

The waveform generator 11 generates a marker pulse at the time that the chirp signal starts. The pulse from the waveform generator 11 is used to trigger the delay circuit 13 (or function) that generates a pulse at the output clock rate that is delayed by approximately the same delay as the latency through the processor 12.

The time measurement circuit 16 (or time interval meter) is used to measure the time from the pulse from the waveform generator 11 to the delayed pulse at the output clock rate. This time is not the latency of the processor 12, since none of the processing functions has been applied, but supplies a reference time against which the latency of the processor 12 can be measured.

The data collected in the analyzer 14 along with the time difference between the auxiliary pulse at the input to the auxiliary pulse at the output is processed using an analysis routine to determine the latency of the processor 12. The analyzer 14 performs the functions shown in FIG. 2.

Figure 4:
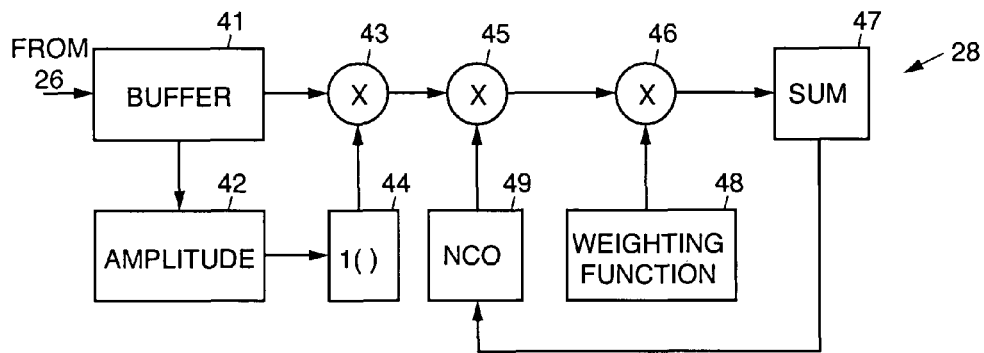
FIG. 4 illustrates the second of the two steps of the frequency analysis which implements iterative measurement of the change in frequency.

The analyzer 14 comprises frequency shift circuits comprising an oscillator 21 whose output is coupled to a 90 degree hybrid 22 whose respective outputs are coupled to first and second mixers 23, 24. The chirp signal is also input to the first and second mixers 23, 24. Outputs of the first and second mixers 23, 24 are coupled through first and second low pass filters 25a, 25b and input to a third mixer 26. The third mixer 26 mixes low pass filtered chirp signals with a complex chirp signal 27 and this mixed signal is input to a frequency analysis circuit along with the auxiliary pulse that starts signal collection in a buffer 41 (FIG. 4). The output of the frequency analysis circuit 28 is a frequency difference signal (ΔFREQ).

Figure 2:
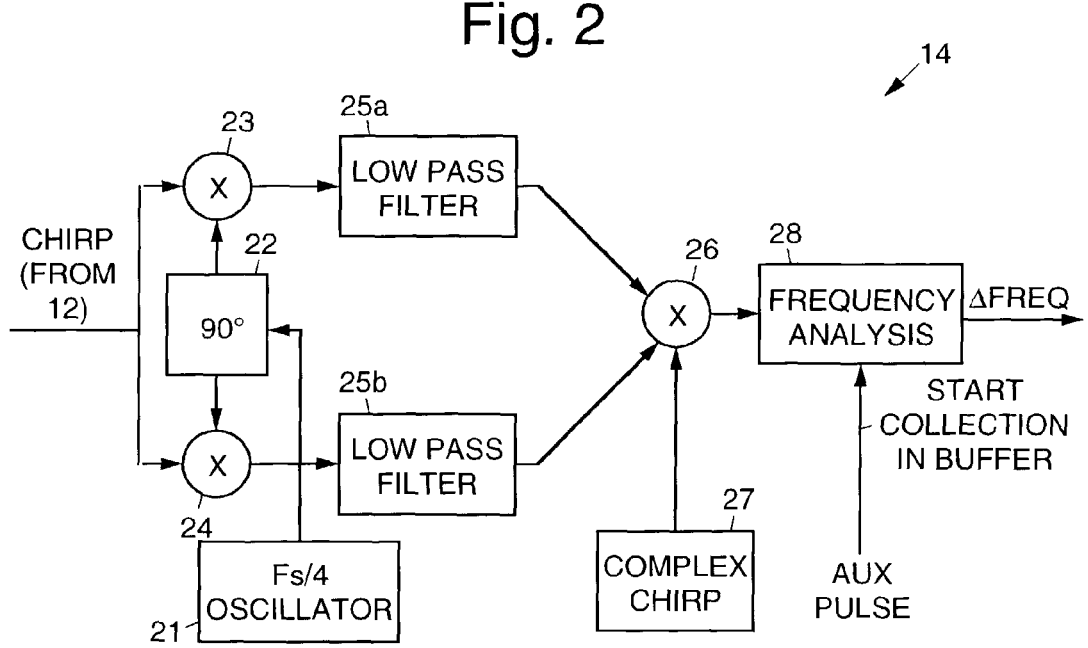
FIG. 2 illustrates an exemplary analysis routine used in the present invention.

As is illustrated in FIG. 2, the analysis routine shifts the frequency of the input (chirp signal) so that it is a complex signal with the center frequency of the passband shifted to DC, then mixes it with the chirp signal 27. A basic assumption of the analysis is that there has been no commanded frequency shift in the signal through the processor 12. The only frequency shift is that induced by changing the sample rate of a pre-detection signal. The processing passes the signal through the frequency shift circuits where the frequency shift is set to zero, so the latency will be the same as it would be with frequency shift.

If it were desired to insert a frequency shift into the processing, the measurement could correct for the frequency shift by adjusting the frequency shift of the first mixer 23 in the analysis.

The frequency analysis measures very precisely the frequency of the sine wave that is the difference frequency between the input chirp signal and the chirp signal that is generated in response to the pulse that accompanies the input signal.

Figure 3:
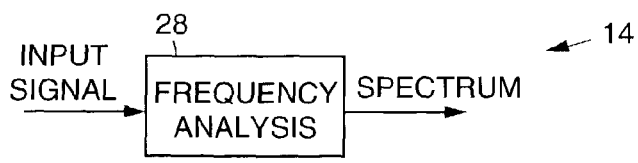
FIG. 3 illustrates the first of two steps of the frequency analysis.

FIG. 3 shows the first of the two steps of the frequency analysis. As is shown in FIG. 3, a coarse estimate of the difference frequency is the frequency that has the maximum power in the spectrum.

A simple spectral analysis over the time period of the chirp forms a coarse estimate of the difference frequency. The estimate is accurate to within one cell of the fast Fourier transform (FFT) processed in the analysis. Since the FFT is taken over the time of the input chirp signal, the estimate of the frequency is accurate to $1/T_{chirp}$ Hz, where $T_{chirp}$ is the length of the chirp.

The second step of the frequency estimation is to refine the frequency estimation using an iterative estimation procedure as is shown in FIG. 4.

The processing estimates the frequency using the estimate from the FFT as the first estimate of the frequency for a numerically controlled oscillator (NCO) 49. The complex signal stored in the buffer 41 is multiplied 45 by the complex NCO signal output by the NCO 49. The output is multiplied 46 by a weighting function 48 and summed 47.

The weighting function 48 is a signal proportional to time:

$$WT(t) = const \cdot t \cdot window(t)$$

where t=−T/2 to T/2

An exemplary window that is used is a Kaiser window function.

The weighting function 48 is a simple ramp in time modified by the weighting function 48. The weighting function 48 is an odd function in t. When the constant is calibrated properly, the result of summing from −T/2 to T/2 is a value whose quadrature component is proportional to frequency. The function is an effective discriminator.

To make the result more accurate as an estimator of frequency, the amplitude 42 of the signal from the buffer 41 is normalized 44 to an amplitude of one. That is, the average absolute value of the complex signal is determined and used to divide 43 the values from the buffer 41, resulting in a signal with an amplitude of one.

The second estimate measures the frequency difference between a sine wave at the first frequency estimate and the observed difference signal. The next estimate uses the second estimate as the basis for the estimate of the frequency. The signal is sent from the buffer 41 through the processing routine, generating the next estimate of the frequency. In this manner the estimate is successively refined.

When the change in phase of the difference signal beat against the estimated frequency sine wave is zero, the best estimate of the frequency of the difference signal has been achieved.

This estimate of the frequency can be several orders of magnitude better than the estimate from the FFT. The estimate is a direct estimate of the rate of change of phase instead of a basic count of the number of cycles per unit time of the sine wave. Counting the number of cycles will result in an error of +/− one cycle in the time interval of the measurement. Estimating the rate of change of phase results in an accuracy that is much better than one cycle in the time interval. The accuracy of the FFT is roughly 1/N cycles per sample, where N is the number of samples. The accuracy of the rate of change estimate is proportional to $1/N^{3/2}$. The accuracy of the FFT estimate is +/− one cycle in the time of the estimate for all carrier-to-noise ratios greater than a basic threshold. The accuracy of the rate of change estimate continues to improve as the carrier-to-noise ratio improves.

The change in frequency is converted to a change in time using the rate of change of the chirp signal. The rate of change of the chirp signal is Fs/2 cycles in N samples, where Fs is the input sample rate and N is the number of samples in the chirp. The rate of change is in terms of cycles per sample. It can be changed to cycles per second, or Hertz, by multiplying by the sample rate. In these terms the rate of change is directly the bandwidth of the chirp divided by the time of the chirp:

$$\Delta t = \Delta f / \text{Chirp rate}.$$

The measure of the time from the chirp that starts at the first sample of the collected data to the chirp that comes through the processor 12 is a component of the measurement of the latency. The other component is the measurement of the time from the pulse at the start of the input chirp to the auxiliary pulse at the output sample rate.

Figure 5:
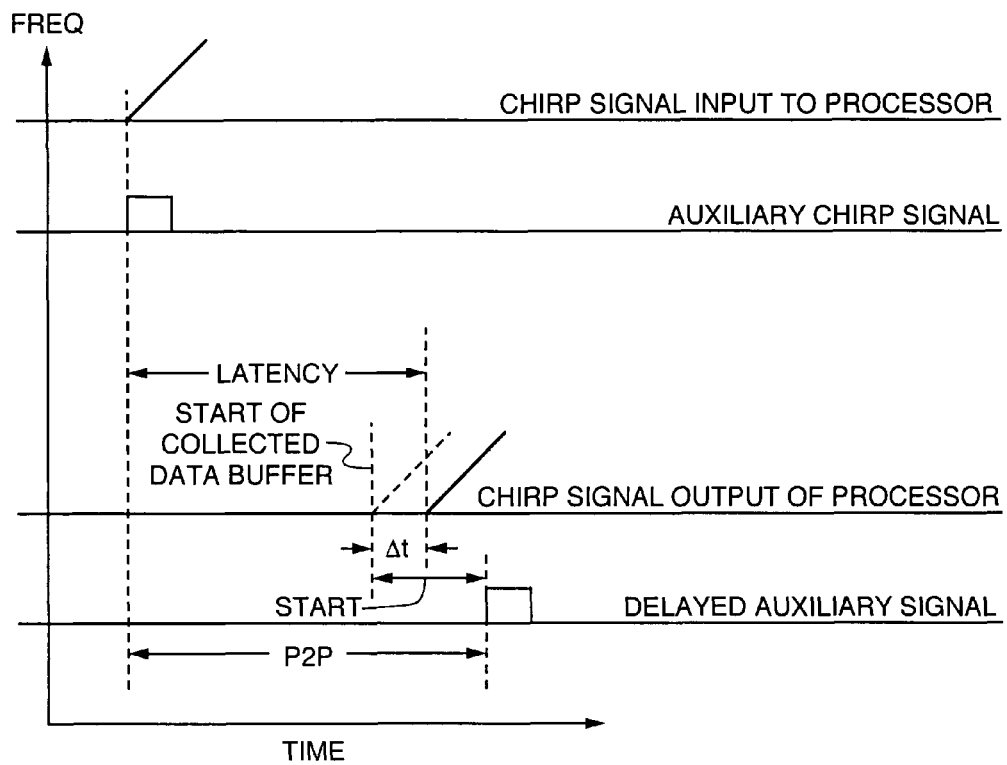
FIG. 5 is a chart that shows the relationships of the times in the latency calculation.

FIG. 5 shows the relationships of the times in the latency calculation. The pulse-to-pulse (P2P) time is measured with an oscilloscope or a time interval meter. The input pulse is a pulse that occurs at the input sample rate synchronous with the start of the chirp output from the waveform generator 11. The output pulse is a pulse that occurs at the output sample rate. The output pulse is generated by a fixed number of samples at the input rate followed by a fixed number of samples at the output rate. The result is a delay from the input pulse that is constant, but has no relationship to the latency through the circuit except that it is close to the same delay as the latency.

The pulse to pulse time measurement is easier if the time is constant for each chirp. If the chirp time is an integer number of samples at the input sample rate and at the output sample rate, the time of the output of the auxiliary bit with respect to the input of the auxiliary bit will not change. This requires that the length of the chirp be constrained depending on the input sample rate and the output sample rate.

When the pulse to pulse time is constant, the pulse to pulse time can be measured for any chirp signal and applies to all of the chirp signals. The variability of the measurement can be evaluated.

The output pulse is used simply as a reference point from which to make the measurement of the latency of the circuit 12. The output pulse may be generated by a counter running at the output clock rate. The counter is reset by the input pulse, then counts to a specified value. When the specified value is reached, the counter generates an output that is used as the timing reference.

Data containing the chirp is collected at the output of the circuit 12 or processor 12 whose latency is to be measured.

The data collection can be controlled by the auxiliary pulse, collecting a number of samples at the output sample rate before the arrival of the auxiliary pulse through the delay circuit 13.

The delay from the first sample of the collection of data to the start of the chirp contained in the data is measured as discussed above. The auxiliary chirp signal is generated that starts with the first sample of the collected data. The difference frequency between this auxiliary chirp signal and the chirp signal from the circuit is measured and converted to a time difference $\Delta t$.

The time from the start of the collection of data to the auxiliary pulse at the output, the start time, is the number of samples to the auxiliary pulse times the time for one sample at the output sample rate. The time for one sample is the reciprocal of the output frequency.

The latency of the processor 12 or circuit 12 is the pulse-to-pulse time minus the time from the start of the data collection to the second pulse (delayed pulse) plus $\Delta t$. That is, Latency=P2P−Start Time+$\Delta t$.

Thus, it can be seen that all of the measurements of latency are done at the output of the circuit 12 or processor 12 whose latency is to be measured, except for the pulse-to-pulse time. All of the measurements are done at the output sample rate. The result is that there is no confusion between the input and output sample rate in the measurement of the latency.

The measurement of latency may be done with one chirp signal and one output pulse generated in response to one input pulse. Alternatively, the chirp signal may be repeated along with the repeated generation of the auxiliary pulses. When the chirp signal is repeated, measurement of the pulse-to-pulse time is more convenient if the pulse-to-pulse time is constant. That is, the chirp signal is preferably an integer number of samples at the output sample rate, so that the sequence of pulses and chirps recurs with the same pulse-to-pulse time. Of course, the chirp is also preferably an integer number of samples at the input rate.

Latency of the digital circuit 12 can be determined by using a chirp signal hat is passed through the circuit 12 and a delayed auxiliary pulse (or chirp signal). The auxiliary pulse establishes the time relationship between the input sample rate and the output sample rate. The chirp signal establishes the timing at the output sample rate to sub-sample delay values from the start of data collection. By combining the two measurements, the latency can be measured to a small fraction of an output sample time in spite of the distortions caused by changes in sample rate or changes in frequency caused by the processing.

For the purposes of completeness, FIG. 6 is a flow chart illustrating an exemplary latency measurement method 60 in accordance with the principles of the present invention. The exemplary latency measurement method 60 comprises the following steps.

An input signal is processed 61 by a circuit whose latency is to be determined. An auxiliary signal that marks samples of the input signal applied to and output from the circuit are processed 62 by a delay circuit. The signals input to and output from the delay circuit are processed 63 to determine the time difference therebetween, which corresponds to a reference time against which the latency of the circuit is measured. Outputs of the circuit and delay circuit are processed 64 by an analyzer along with the reference time to determine the latency of the circuit. Data containing primary signals are collected 65 during a predetermined data collection time period. The latency of the circuit is determined 66 by adding the data collection time to the reference time and subtracting the time between the start of data collection and the delayed auxiliary signal.

Thus an improved techniques that measure latency of a digital processor or circuit have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus that determines latency of a circuit, comprising:
    a waveform generator that outputs a primary signal and an auxiliary signal that corresponds to a sample of the primary signal;
    a circuit whose latency is to be determined that processes the primary signal;
    a delay circuit that delays the auxiliary signal;
    a time measurement circuit that processes the auxiliary signal and delayed auxiliary signal to generate a time difference signal that corresponds to a reference time; and
    an analyzer that collects data containing the primary signal during a predetermined data collection time period, and determines the latency of the circuit by adding the data collection time period to the reference time and subtracting the time between the start of data collection and the delayed auxiliary signal.

2. The apparatus recited in claim 1 wherein the data collection time period is controlled by the auxiliary signal.

3. The apparatus recited in claim 1 wherein the analyzer determines the latency of the circuit by determining a coarse estimate of a difference frequency having a maximum power in a spectrum of a chirp signal, and refining the coarse estimate of the difference frequency using an iterative estimation procedure that is a direct estimate of the rate of change of phase such that, when the change in phase of the difference frequency beat against a sine wave corresponding to the coarse estimate of the difference frequency is zero, the best estimate of the frequency of the difference signal has been achieved.

4. Apparatus that determines latency of a circuit, comprising:
    a waveform generator that outputs a chirp signal and an auxiliary chirp signal;
    a circuit whose latency is to be determined that processes the chirp signal;
    a delay circuit that delays the auxiliary chirp signal;
    a time measurement circuit that processes the auxiliary chirp signal and delayed auxiliary chirp signal to generate a time difference signal that corresponds to a reference time; and
    an analyzer that collects data containing the chirp signal during a data collection time period, and determines the latency of the circuit by adding the data collection time period to the reference time and subtracting the time between the start of data collection and the delayed auxiliary chirp signal.

5. A method for measuring the latency of a circuit comprising the steps of:
    processing a primary signal through a circuit whose latency is to be determined;
    processing an auxiliary signal that marks samples of the primary signal applied to and output from the circuit in a delay circuit;
    processing the auxiliary signal input to the delay circuit and delayed auxiliary signal output from the delay circuit to determine the time difference therebetween, which time difference corresponds to a reference time against which the latency of the circuit is measured; and
    processing outputs of the circuit and the delay circuit and the reference time to determine the latency of the circuit by collecting data containing the primary signal during a predetermined data collection time period, adding the data collection time period to the reference time, and subtracting the time between the start of data collection and the delayed auxiliary signal.

\* \* \* \* \*